(12) United States Patent
Williams et al.

(10) Patent No.: US 11,072,174 B2
(45) Date of Patent: Jul. 27, 2021

(54) PRINTING SUBASSEMBLY

(71) Applicant: Hewlett-Packard Development Company, L.P., Spring, TX (US)

(72) Inventors: Kenneth Russell Williams, Vancouver, WA (US); Vern Elliit Myers, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 16/500,511

(22) PCT Filed: Apr. 12, 2017

(86) PCT No.: PCT/US2017/027133
§ 371 (c)(1),
(2) Date: Oct. 3, 2019

(87) PCT Pub. No.: WO2018/190820
PCT Pub. Date: Oct. 18, 2018

(65) Prior Publication Data
US 2020/0055314 A1  Feb. 20, 2020

(51) Int. Cl.
*B41J 2/14* (2006.01)
*B41J 2/145* (2006.01)
(52) U.S. Cl.
CPC ..................... *B41J 2/145* (2013.01)
(58) Field of Classification Search
CPC . B41J 2/14024; B41J 2/145; B41J 2/16; B41J 2/155; B41J 2/2146; B41J 2/515; B41J 2/2103; B41J 2202/20; B41J 2202/21; B41J 3/54; B41J 3/60; B41J 3/543; B41J 25/34; B41J 1/16; B41J 1/20
See application file for complete search history.

(56) References Cited

U.S. PATENT DOCUMENTS

| | | | |
|---|---|---|---|
| 3,788,215 | A | 1/1974 | Lambert |
| 4,597,682 | A | 7/1986 | Rooney |
| 5,257,043 | A | 10/1993 | Kneezel |
| 5,691,753 | A | 11/1997 | Hilton |
| 5,823,688 | A | 10/1998 | Mizukami et al. |
| 6,783,209 | B2 | 8/2004 | Gompertz |
| 8,042,910 | B2 | 10/2011 | Ray et al. |
| 9,242,493 | B2 | 1/2016 | Campillo et al. |
| 2005/0088481 | A1 | 4/2005 | Fujimoto et al. |
| 2009/0027445 | A1 | 1/2009 | Chikamoto |

(Continued)

FOREIGN PATENT DOCUMENTS

| | | |
|---|---|---|
| CN | 1532061 | 9/2004 |
| CN | 1922020 | 2/2007 |

(Continued)

OTHER PUBLICATIONS

Domino UPS Digital Profit e at. Labetexpo Europe, 2011—http://www.domino-printing.com/ ~ 2 pages.

*Primary Examiner* — Kristal Feggins
(74) *Attorney, Agent, or Firm* — Dicke Billig & Czaja PLLC

(57) ABSTRACT

A printing subassembly is disclosed. A printing subassembly includes a frame, a printbar coupled to the frame, and a lift mechanism coupled to the printbar. The lift mechanism selectively moves the printbar with respect to the frame. A fluid receiving system is coupled to the printbar.

15 Claims, 3 Drawing Sheets

(56) References Cited

U.S. PATENT DOCUMENTS

2009/0295872 A1* 12/2009 Ray et al. ................ B41J 2/155
2016/0152032 A1   6/2016 Campillo et al.
2016/0271945 A1   9/2016 Togashi et al.

FOREIGN PATENT DOCUMENTS

| CN | 201102355 | 8/2008 |
| CN | 101274534 | 10/2008 |
| CN | 102317080 | 1/2012 |
| CN | 103786439 | 5/2014 |
| CN | 204506134 U | 7/2015 |
| CN | 204820353 U | 12/2015 |
| CN | 1872551 | 12/2016 |
| JP | 2008-254189 | 10/2008 |
| JP | 2012-166554 | 9/2012 |
| JP | 2015-051589 | 3/2015 |
| WO | WO-2014017515 A1 | 3/2014 |

* cited by examiner

PRINTING SUBASSEMBLY

BACKGROUND

Printing devices—including printers, copiers, fax machines, multifunction devices including additional scanning, copying, and finishing functions, all-in-one devices, or other devices such as pad printers to print images on three dimensional objects and three-dimensional printers (additive manufacturing)—receive digital images or digital models and produce objects or images on media such as plain paper, photo paper, transparencies, and other media such as metals and polymeric media in addition to or instead of broad and thin media. Images can be obtained directly from the printing device or communicated to the printing device from a remote location such as from a computing device or computing network. Ink or other printing materials can be stored in refillable or removable containers. In the example of a sheet fed device, a sheet is selected from a stack of media, typically one item at a time, and fed through a media support along a feedpath to an output tray. In a roll fed device, a web of media is fed through a media support along the feedpath to an output. The media interacts with print heads at the media support to produce images on the media. Three-dimensional printers receive a digital model or other data source of an object and can form successive layers of material to produce a three-dimensional object, such as via printer heads, extrusion, sintering-based processes or other processes.

DETAILED DESCRIPTION

Many commercially used printing device, such as inkjet printers, copiers, or multifunction devices in offices, schools, and laboratories, are repaired on site rather than being returned to a factory. A technician is often dispatched in short order to the printer where the maintenance is performed based on a service contract. If repairs are too frequent and too involved, business suffers or users become frustrated with the inability to use the printing device or the expense of the service contract.

In many examples, commercially used printing devices are sturdily built but difficult to repair. In one example, a printing device may have a difficult to repair printbar, which can include a set of print heads spanning a width of media. The repair of a printbar may involve initially removing the scanner or document feeder and disassemble part of the components of the feedpath and data cables. If a printbar has failed or is in disrepair, it is likely that associated parts such as drive motors, gears, bearings, and other features are also nearing the end of service life. These parts can also be difficult to repair and are also replaced one-by-one often in separate service visits. The repair of difficult to access small parts at various service intervals can lead to costly repair visits for relatively inexpensive components, repeated service visits, and long repair times.

Figure 1:
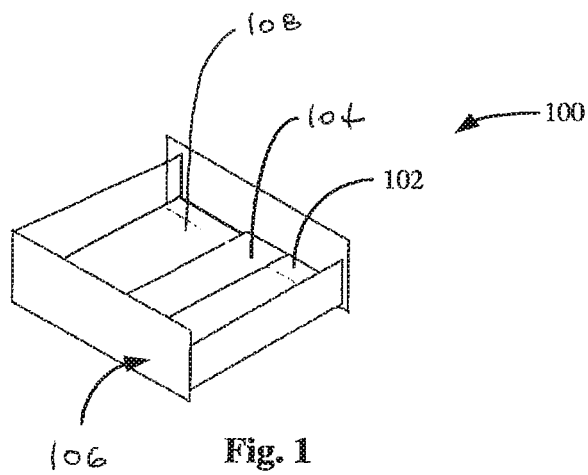
FIG. 1 is a schematic diagram illustrating an example printing subassembly.

FIG. 1 illustrates an example printing subassembly 100, which can include a replaceable printing subassembly for use in a printing device. The printing subassembly 100 includes a printbar 102 and lift mechanism 104 each coupled to a frame 106. The lift mechanism 104 selectively moves the printbar 102 with respect to the frame 106. A fluid receiving system 108 is coupled to the printbar 102. For example, the fluid receiving system 108 is in fluid communication with the printbar 102.

The printing subassembly 100, in one example, may also include other components, such as a service station and other components, coupled to the frame 106 that are not intended to be repaired or repaired in the field. Instead, a replaceable printing subassembly 100 can be removed from the printing device and replaced with a new subassembly. In one example, the fluid receiving system 108 can include a pump, but the printing subassembly 100 does not include a user-refillable ink container or ink supply. Instead, the user-refillable ink container or ink supply is located with the printing device and is removably coupled to the fluid receiving system 108.

Figure 2:
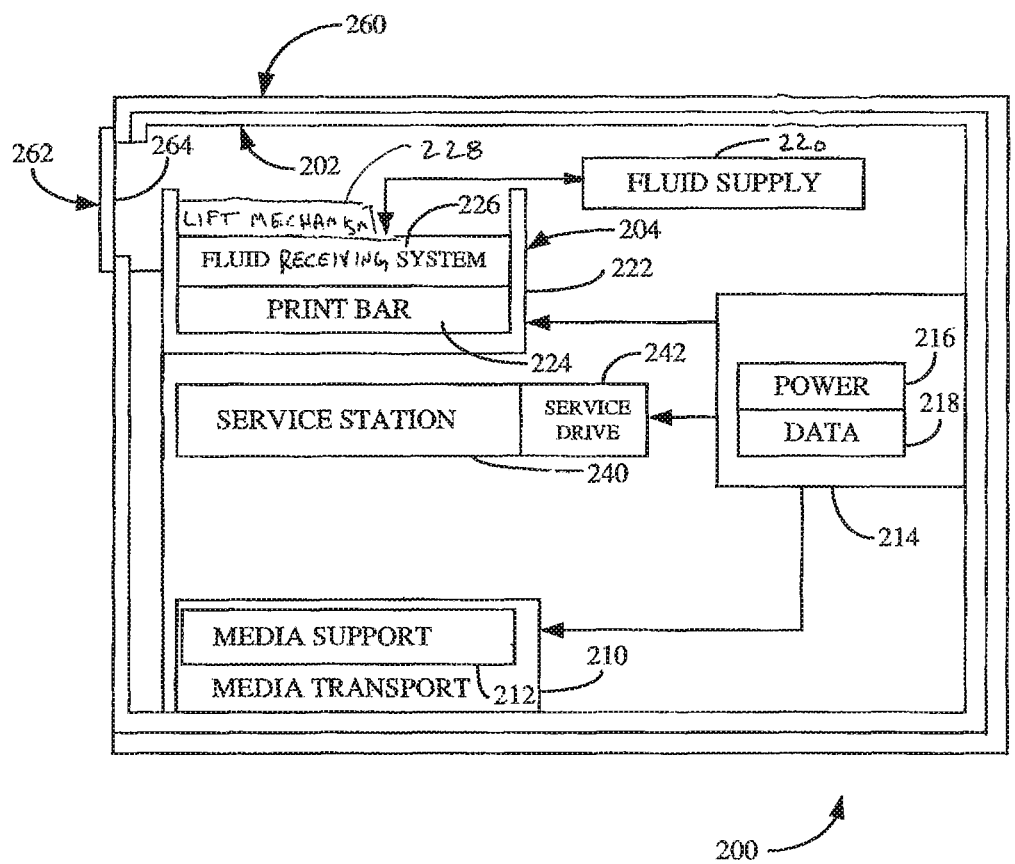
FIG. 2 is a schematic diagram illustrating an example of a printing device including a replaceable printing subassembly such as the printing subassembly of FIG. 1.

FIG. 2 illustrates an example printing device 200 having a chassis 202 operably coupled to an installed replaceable printing subassembly 204. The replaceable printing subassembly 204 can be an example of the printing subassembly 100.

Exemplars of printing device 200 suitable for accepting the replaceable printing subassembly 204 can include one or combinations of two or more of a printer, scanner, copier, fax machine, plotters, or other devices such as pad printers or three-dimensional printers. The printing device can be operated as one or combinations of two or more of a stand alone device, a device coupled to a computer network, or a peripheral or auxiliary device operated by a computer or other processing device. In one example, the printing device is an inkjet printer. Print media can include paper, plastic, fabric, in various sizes and types, such as sheets of paper, roll feed media, and other media. The disclosure includes examples in the context of inkjet printing on a medium for illustration, and the examples are not intended to be limited to ink or printing on media, and can include dispensing, ejecting, or otherwise depositing of fluids other than ink for uses other than printing on media.

The printing device 200 can include an media transport system 210 having a media support 212 adapted to present media for marking with the printing subassembly 204. For example, the media transport system 210 can include mechanisms to deliver and present media in the form of sheets or a web roll to the subassembly 204 for printing. A controller 214, which can include a processor, a memory device, and communication circuitry, is operably coupled to the media transport system 210 to control the media transport system 210. The controller 214 can include a power circuit 216 and image processing circuitry 218 coupled to the printing subassembly 204 to provide power and data, such as image data, to operate the subassembly 204. The printing device 200 also includes a refillable fluid supply 220 to provide ink or other material for printing. The refillable fluid supply 220 can include multiple reservoirs for receiving multiple color inks, respectively, for color printing or a single reservoir for a monochrome printing, for example. In one example, the fluid supply is operably coupled to the chassis 202.

The printing subassembly 204 in the example includes a frame 222, printbar 224, fluid receiving system 226, and lift mechanism 228. The frame 222 can be removably coupled to the chassis 202, and can include coupling and locating features that selectively position the frame with respect to components of the printing device 200, such as the media support 212. The controller 214 can be operably coupled with signal connections to selectively operate the printbar 224.

Frame 222 can include a set of upstanding walls punched or cut from a generally rigid material such as sheet metal. In one example, four upstanding walls of the frame 222 surround the printbar 224 and fluid receiving system 226. The frame 222 can include an alignment system having one or more protuberances extending from the frame such as flanges or tabs, or openings such as slots or holes. The alignment system can be used to correctly position and fully constrain the rigid printing subassembly 204 within the printing device 200 in all six degrees of freedom of motion. The alignment system is configured to mate with or attach to corresponding features in the printing device, such as on a chassis 202, to constrain the printing subassembly 204. The frame 222 can include other features, such as holes, to receive fasteners such as screws to attach the subassembly 204 to the chassis 202 of the printing device 200.

The fluid receiving system 226 is in fluid communication with the printbar 224. Additionally, the fluid receiving system 226 is couplable via one or more removable connections to be in fluid communication with the fluid supply 220. In one example, the fluid receiving system 226 on the frame 222 includes a pump to draw ink or other material from the fluid supply 220 and provides the ink or other material to the printbar 224 for printing on media. In some examples, the fluid receiving system 226 can include several pumps, each corresponding with the multiple fluid reservoirs of the fluid supply 220. The fluid receiving system 226 includes a coupling that can be operably connected, such as removably coupled to the fluid supply 220. In an example in which the fluid receiving system 226 includes the pump, the pump can include a fluid vessel such as a tube with the coupling that can be removably connected to the fluid supply. The coupling can include a needle, septum, or other fluid coupling mechanism to attach to the fluid supply and transport fluid to the pump. In an example in which the frame 222 does not include a pump, the fluid receiving system 226 can include a tubing removably coupled to the pump. The fluid receiving system, however, does not include the refillable or replaceable fluid supply 220, which are not located with the subassembly 204.

The printbar 224 includes an elongate element having one or more print heads for dispensing ink. In one example, the printbar 224 spans the width of print media on media support 212 such that the printbar 224 does not traverse back and forth across the width of the print media to dispense ink.

Printbar 224 includes one or more pens for printing. In one example, the printbar 224 includes multiple pens arranged end-on-end in an array on the printbar 224 with part of each pen overlapping a part of an adjacent pen along the span of the printbar. A printbar 224 can include, for example, two or more rows of pens in a staggered configuration in which one pen in each row extends into the overlap between pens for seamless printing across the entire span or much of the span of the printbar. In one example, the configuration of the pens can provide for seamless printing across the full span of the print media.

Pens include mechanisms configured to eject a fluid such as ink onto media, for instance, on a web or sheet. Each pen can include one or more print heads and a self-contained reservoir or cache of fluid that is applied to the print heads. The self-contained reservoir or cache of fluid is in fluid communication with the fluid receiving system 226 and receives fluid from the fluid supply 220. Each print head can include one or more printing dice. For example, a print head can include a die configured to print cyan and magenta ink and another die can be configured to print black and yellow ink. In one example, print heads include thermal resistive drop-on-demand inkjet print heads. In another example, print heads can include piezo-resistive inkjet print heads. In still another example, print heads may comprise other mechanisms configured to eject fluid in a controlled manner.

In the example of thermal resistive inkjet print heads, a heating element is located with individualized nozzles that eject ink. An electric current is applied to heat the heating element and cause a small volume of ink to rapidly heat and become vaporized. Vaporized ink forms a pressurized bubble that ejects fluid ink through the nozzle as the ink expands. A print head driver circuit is coupled to the individual heating elements to provide energy pulses and control the ejection of liquid ink and thus the deposition of ink drops from the nozzles. The print head drivers are responsive to character generators and other image forming circuitry, which can be included as part of controller, for example, to energize selected nozzles of the print head to form images on the print media.

The printing subassembly 204 can also include a service station 240 to clean the printbar 224 and a cap to cover the printbar 224 when not in use. The service station 240 can also include, or be operably coupled to a service drive 242 and actuated by the controller 214 with signal connections to move the service station 240 with respect to the printbar 224. In one example, the service station 240 is coupled to the frame 224 and is included with the replaceable printing subassembly 204 and attached to frame 222. In another example, the service station 240 is not included with the replaceable printing subassembly 204 and is operably coupled to the chassis 202.

The lift mechanism 228 can be used to finely position the printbar 224 in a particularly selected distance from a media support 212, such as "pen-to-paper spacing," in response to signals provided from a controller 214 based on the type of print media and other considerations. Additionally, the lift mechanism 228 can be used to separate the printbar 224 from the media support 212 in order to apply the service station 240 to the print heads. The lift mechanism 228 can selectively move the printbar 224 relative to the media support 212 from a printing position, in which the print heads are proximate to the print media to one or more service positions in which the service station 240 may clean or cap the printbar 224 when the print heads are not printing.

The lift mechanism 228 can include a motor and a drive operated in response to signals from the controller 214. The drive can include gears or other mechanism to cause the printbar 224 to move with respect to the frame 222 along a lift guide. In one example, the lift guide can include a rack coupled to the frame 222, and the motor is operably coupled to a pinion that engages the rack. In this example, the motor and pinion can be operably coupled to the printbar 224 to move with the printbar 224 and with respect to the frame 222. The motor can selectively locate the pinion with respect to the rack to position the printbar 224 with respect to the frame 222.

Subassembly 204 can include circuitry to connect appropriate power and actuation signals to the printbar 224, fluid receiving system 226, lift mechanism 228, and service station 240, if included on the subassembly 400. In one example, the circuitry is included on one or more printed circuit assemblies that includes one or more flat flexible circuits having signal connectors that can be operably coupled receive power and data signals from controller 214. In one example, the flat flexible circuits are configured not to overlap in order to reduce cross-talk or electromagnetic interference. The fixed position of signal lines in the flat flexible circuits avoid overlap if components of the subassembly were separately installed or repaired and care was not given to the corresponding wiring attached to the controller.

In the illustrated example, the chassis 202 is coupled to and surrounded by a housing 260. The housing 260 can include an opening 262, and a cover 264 is selectively placed over an opening 262. In one example, the cover 264 can be detached, i.e., removably attached, from the housing 260 to expose the subassembly 204 within the housing 260 via the opening 262. In another example, the cover 264 remains attached to the housing 260, such as via a hinge or other mechanism, and is selectively moved away from the opening 262 to provide access to the subassembly 204. In one example, the opening 262 is large enough to allow a technician to detach the subassembly 204 from the chassis 202, from the controller 214, and from the fluid supply 220 and remove the subassembly 204 through the opening 262. The mechanical fasteners to fasten the subassembly 204 to the chassis 202, the signal connectors to couple the subassembly 204 to the controller 214, the fluid connectors to couple the subassembly to the fluid supply 220 are readily accessible via the opening 262 to remove the subassembly 204. Further, a replacement subassembly can be reattached to the controller 214 and fluid supply 220 and connected to the chassis 202 via the opening 262. Another example housing includes multiple openings including an opening to access the fasteners, and electrical and fluid connections to the subassembly 204. The housing may include another opening to refill the fluid supply 220.

Figure 3:
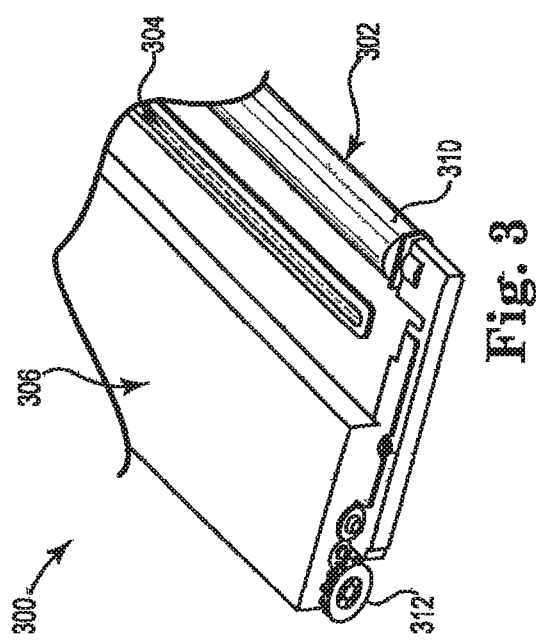
FIG. 3 is a schematic diagram illustrating an example feature included on an example printing subassembly, such as the example printing subassembly of FIG. 1.

FIG. 3 illustrates an example service station 300 generally corresponding with service station 240. During printing, ink tends to build up at the nozzles of the print head. Ink build-up or residual ink can be caused from ink droplets that are not completely ejected, excess ink around the nozzle, and ink splatter reflected from the print media. The nozzles are also susceptible to being clogged from dust, quick drying ink, ink solids, and media particles.

Service station 300 includes a wipe mechanism 302 to clean and preserve the functionality of the print heads and a cap 304 to cover the print heads when not in use to reduce the likelihood of ink drying or contaminants from collecting in and over the nozzles. In one example of the service station being carried on the frame 222, service station 300 is operably coupled to the frame 222 via a service guide (not shown). In an example of the service station 300 being carried on the chassis 204 and not on the replaceable printing subassembly 204, the service guide is coupled to the chassis 204. Service station 300 can also include, or be operably coupled to, a service drive 306 to move the service station 300 with respect to the frame 222 and printbar 224 along the service guide in response to signals from the controller 214.

The wipe mechanism 302 can include a web roll and a feed mechanism. The feed mechanism can include two spools, such as a feed supply and a take up reel, between which an exposed region of web roll 310 is wound. In one example, the spools are operably coupled to gear or cogwheel 312, which can be selectively engaged with a pawl to advance the web roll. The web roll can be advanced in response to signals from a controller 214, which can base a determination of whether to advance the web roll on such factors including health of the printbar, frequency of use, and timing of last wipe.

The cap 304 can be configured to fit and generally seal the dice of the printbar 224. In one example, the cap 304 is formed of a compliant material such as an ethylene propylene diene monomer (M-class) (EPDM) rubber or other elastomer suitable for sealing the print heads and inhibiting the print heads from drying and accumulating contaminants when not in use. In one example, the cap 304 can include a miniature vent to allow air pressure within the cap to slowly adjust to ambient pressure. The print heads can be capped in response to signals from the controller 214, which can base a determination of whether to cap on such factors as time between print jobs or whether the printing device has stopped printing, been powered off, or whether the subassembly 204 is being removed from the printing device 200.

The service drive 306 can selectively position the service station 300 with respect to the frame 222 and printbar 224 along the service path of travel between a wiping position to wipe the printbar with the exposed portion of the web roll 310, a capping position to cover the printbar 224 with the cap 304, and one or more other positions to permit the lift mechanism 226 to locate the media support 212 with respect to the printbar 224 in a printing position.

Figure 4:
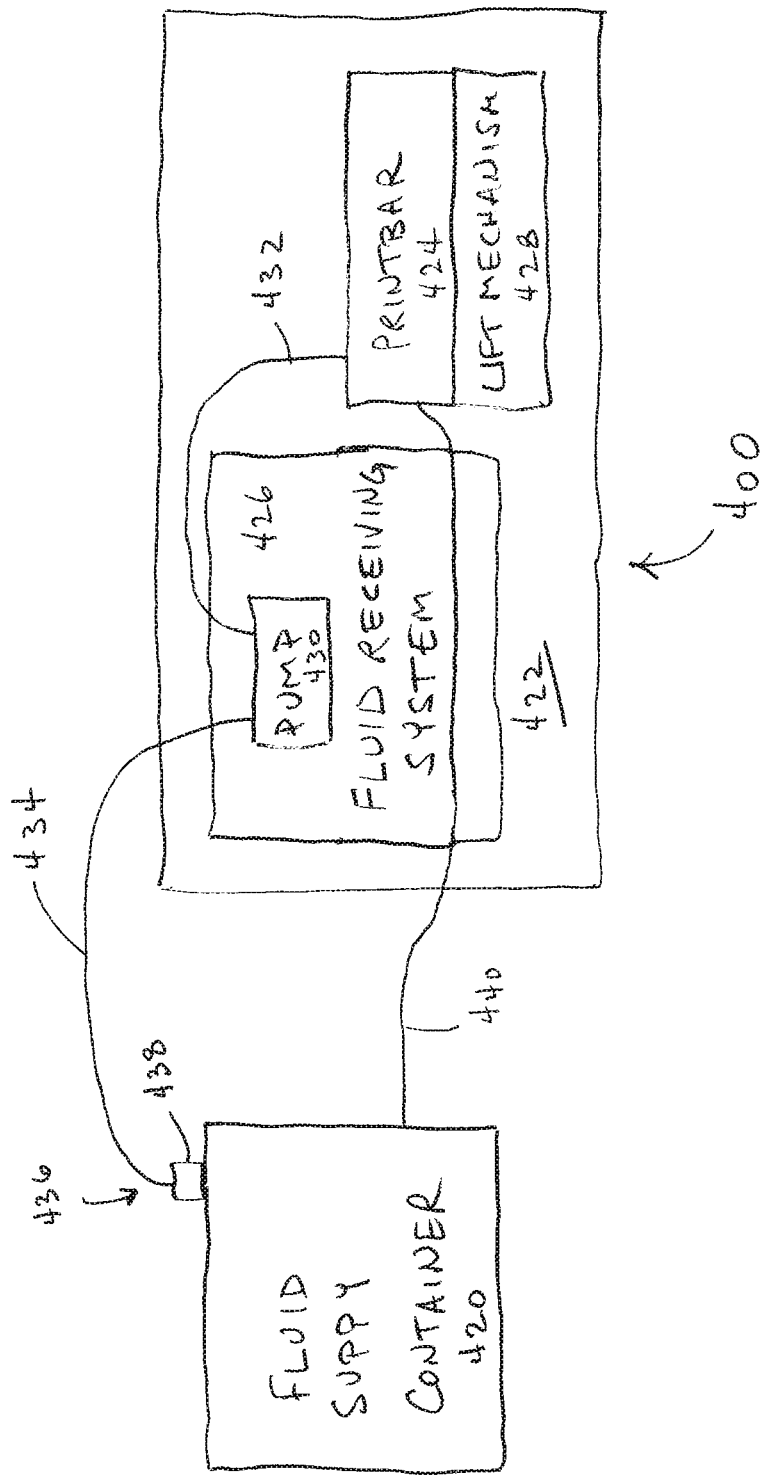
FIG. 4 is a schematic diagram illustrating another example of a printing subassembly of the example printing subassembly of FIG. 1.

FIG. 4 illustrates an example subassembly 400 having a frame 422, printbar 424, fluid receiving system 426, and lift mechanism 428 constructed in accordance with subassemblies 100, 204. Subassembly 400 is removably coupled to fluid supply container 420, which can be constructed in accordance with supply 220 and is not included as part of subassembly 400. In the example, the fluid receiving system 426 includes a pump 430 in fluid communication with printbar 424 via tubing 432. For example, the tubing 432 can be in fluid communication with a self-contained reservoir or cache of fluid on the printbar 424. Tubing 432 can be configured to not be removable from the printbar 424. In another example, tubing 432 is also not removable from the pump 430 if the pump 430 is included as part of the subassembly 400.

In the example of pump 430 included as part of the subassembly 400, the fluid receiving system 426 can also include additional tubing 434 in fluid communication with pump 430 that is configured to be coupled to the fluid supply container 420. Tubing 434 can include a distal end 436 having a coupling 438 that is removably coupled to the container 420. The fluid delivery system 426 can include additional tubing 434 to be removably coupled to a fluid container 420 in the case of multiple fluid supply containers, such as a container for each color of ink or bonding agent. In one example, tubing 434 from the fluid container 420 is removably coupled from the pump 430.

In a further example, the fluid receiving system 426 includes return tubing 440 forming a return path of fluid flowing from the printbar 424 to the fluid container 420. Excess fluid or ink from the printbar 424 is returned to the fluid container 420 via return tubing 440 on return path. In one example, returning excess fluid from the printbar 424 to the fluid container 420 can reduce deterioration or slow aging of the ink in the printbar 424. Return tubing 440 can include a coupling 442 on distal end 444 that can be removably coupled to the fluid container 420. The fluid receiving system 426 can include additional return tubing 440 to be removably coupled to a fluid container 420 in the case of multiple fluid supply containers, such as a container for each color of ink or bonding agent.

The fluid receiving system 426 can include additional components and elements to provide fluid from the fluid supply container 420 or containers to the printbar 424. For example, the fluid receiving system 426 can include circuitry and sensors to detect fluid supply levels or fluid flow, and other fluid-related parameters or information on the subassembly 400, and to provide electrical signals to a controller on the printing device, such as controller 214, via an electrical interconnect.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A printing subassembly for use with a printing device, the printing subassembly comprising
 a printbar;
 a lift mechanism;
 a frame removably coupled to the printing device, the frame coupled to the printbar and lift mechanism such that the lift mechanism selectively moves the printbar with respect to the frame; and
 a fluid receiving system coupled to the printbar, the fluid receiving system not movable with respect to the frame.

2. The printing subassembly of claim 1 wherein the fluid receiving system is in fluid communication with the printbar.

3. The printing subassembly of claim 2 wherein the fluid receiving system includes a pump coupled to the frame.

4. The printing subassembly of claim 2 wherein the printbar includes a printbar element coupled to a plurality of print heads.

5. The printing subassembly of claim 1 including circuitry to connect power and data to the printbar.

6. A printing device, comprising:
 a chassis;
 a media support operably coupled to the chassis
 a fluid supply operably coupled to the chassis; and
 a replaceable printing subassembly including,
  a printbar,
  a lift mechanism operably coupled to the printbar to selectively position the printbar with respect to the media support,
  a frame removably coupled to the chassis, the frame coupled to the printbar and lift mechanism such that the lift mechanism selectively moves the printbar with respect to the frame; and
  a fluid receiving system coupled to the printbar and removably couplable to the fluid supply, the fluid receiving system not movable with respect to the frame.

7. The printing device of claim 6 including an inkjet printer.

8. The printing device of claim 6 wherein the chassis includes a housing having an opening and wherein subassembly is accessible from the opening.

9. The printing device of claim 6 wherein the fluid receiving system includes a pump and a tube having a coupling, the coupling being removably couplable to the fluid supply.

10. The printing device of claim 9 wherein the fluid receiving system includes a return tube in fluid communication with the printbar and the fluid supply.

11. The printing device of claim 9 wherein the coupling includes a needle.

12. The printing device of claim 6 comprising a controller having detachable signal pathways operably coupled to the subassembly to connect power and data to the printing subassembly.

13. The printing device of claim 12 wherein the detachable signal pathways include flat flexible circuits.

14. A replaceable printing subassembly for use with a printing device, the replaceable printing subassembly comprising
 a frame removably couplable to the printing device;
 a printbar;
 an ink receiving system in fluid communication with the printbar, the ink receiving system having a pump operably coupled to the frame;
 the frame coupled to the ink receiving system such that the ink receiving system and the printbar do not move with respect to the frame; and
 a lift mechanism operably coupled to the printbar to selectively move the printbar with respect to the frame.

15. The replaceable printing subassembly of claim 14 including a service station operably coupled to the frame and movable with respect to the frame.

* * * * *